United States Patent [19]
Saito

[11] Patent Number: 4,842,456
[45] Date of Patent: Jun. 27, 1989

[54] FORMING UNIT FOR ELECTRODE CHIP OF WELDER

[76] Inventor: Akihiro Saito, 864 Nakashinden, Ebina-shi, Kanagawa-ken, Japan

[21] Appl. No.: 122,969

[22] Filed: Nov. 19, 1987

[51] Int. Cl.$^4$ .............................................. B23C 3/12
[52] U.S. Cl. .................................... 409/145; 409/140
[58] Field of Search ............... 409/139, 140, 180, 181, 409/218; 407/9

[56] References Cited

U.S. PATENT DOCUMENTS

| | | | |
|---|---|---|---|
| 2,286,931 | 6/1942 | Radeke | 409/181 X |
| 2,418,767 | 8/1947 | Hall | 409/181 X |
| 2,930,289 | 3/1960 | Swarts | 408/211 X |
| 4,578,005 | 3/1986 | Fuse et al. | 409/140 |

FOREIGN PATENT DOCUMENTS

| | | |
|---|---|---|
| 0283470 | 12/1985 | Japan . |
| 0103682 | 5/1986 | Japan . |
| 0189883 | 8/1986 | Japan . |
| 0064484 | 3/1987 | Japan . |

Primary Examiner—William L. Sikes
Assistant Examiner—Akm E. Ullah
Attorney, Agent, or Firm—Ratner & Prestia

[57] ABSTRACT

Apparatus for forming welding electrode chips in which the cutters engage the electrode chips to be formed while the electrode chips remain installed in the welding unit. The cutters are elastically supported to accommodate movement of the electrode chips against the cutters. Movement of the electrode chips is limited by a rigid support. The cutters are rotated manually or by a motor-drive.

4 Claims, 3 Drawing Sheets

FORMING UNIT FOR ELECTRODE CHIP OF WELDER

FIELD OF THE INVENTION

This invention relates to a forming unit for an electrode chip of a welder.

PRIOR ART

There are dome type, trapezoid type, pin bell type (navel type) and so on, as is known, in the point shape of an electrode chip of a spot welder. In such electrode chips, the point of the chip is worn away to form an alloy layer, thereby causing a bad weld when the welding under pressure is continued. With the dome type and the trapezoid type, the weld condition deteriorates rapidly because the surface area of the point increases as the abrasion advances. On the other hand, with the pin bell type, the weld condition is better in comparison with the other types even if the point wears because the surface area of the point rarely changes while the navel part remains, but the bad condition of the weld occurs as in the above description when the navel part is used up.

So, conventionally, the worn electrode chip is reformed by using a special machine after the electrode chip is removed from the welder or by using a motor-driven rasp manually.

PROBLEM TO BE SOLVED BY THE INVENTION

However, when reforming the electrode chip with the special machine after removing the electrode chip from the welder, the removal and installation of the electrode chip consumes much time, and, with the pin bell type particularly, the core-fitting is very difficult when the reformed electrode chip is installed in the welder. Also, reforming the electrode chip by hand while the electrode chip remains in the welder requires not only skillful technicians but also much time. In addition, neither method considered above is conducive to production in an assembly-line system as when welding by robots.

This invention provides a forming unit which performs the core-fitting accurately and reforms the electrode chip while it remains in the welding machine. The invention is particularly useful in reforming pin bell type electrode chips.

MEANS FOR SOLVING THE PROBLEM

To perform the above objects, this invention is characterized in providing a cylindrical member, one or more cutters supported in the cylindrical member elastically by a support mechanism, a rotation mechanism for the cutters and a support mechanism for supporting an electrode chip to be cut.

ACTION

The electrode chip forming unit of the invention is positioned between the upper and lower electrode chips of the welder. The electrode chips are moved toward each other, so that the points of the electrode chips are applied to the cutting edges of the cutters. This action moves the cutters toward the center of the cylindrical member. The cutters are supported elastically by one support mechanism and the electrode chips are supported by the second support mechanism. As a rotating mechanism rotates the cutters, the points of the electrode chips are shaped into the prescribed shape After the rotation mechanism is stopped and the cutters stop rotating, the electrode chips are separated and the forming unit is removed.

BRIEF DESCRIPTION OF THE DRAWINGS

FIGS. 1 to 3 show an embodiment of the invention in which the rotation mechanism is operated manually. The numeral 1 is a cylindrical member that has key slots 1a in four places in its inner circumference and stopper recesses 1b of ring shapes at the upper and lower ends of the key slots 1a.

Figure 1:
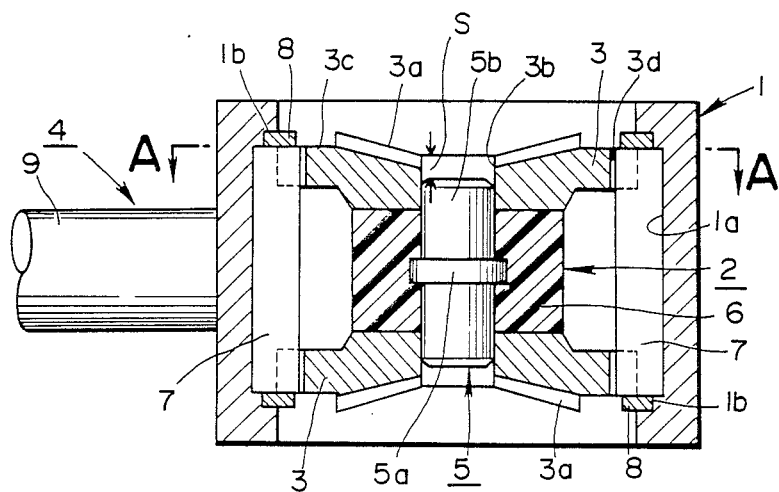
FIG. 1 is a cross-sectional view of a first embodiment of a forming unit of the invention.

The numerals 3,3 are cutters provided at the top and bottom of the cylindrical member 1.

The cutting edge 3a of each cutter is formed with a central opening 3b. The outside surface of each cutter has four key slots 3d located opposite the key slots 1a in the surrounding cylindrical member 1.

The cutters 3,3 are fixed in position by the rubber cylinder 6 constituting a support mechanism 2 between the cutters and keys 7 fitted between key slots 3d of the cutters and key slots 1a of the cylindrical member 1. A snap ring 8 is inserted into each of the stopper recesses 1b of the cylindrical member 1, thereby compressing the rubber cylinder 6 slightly.

Figure 2:
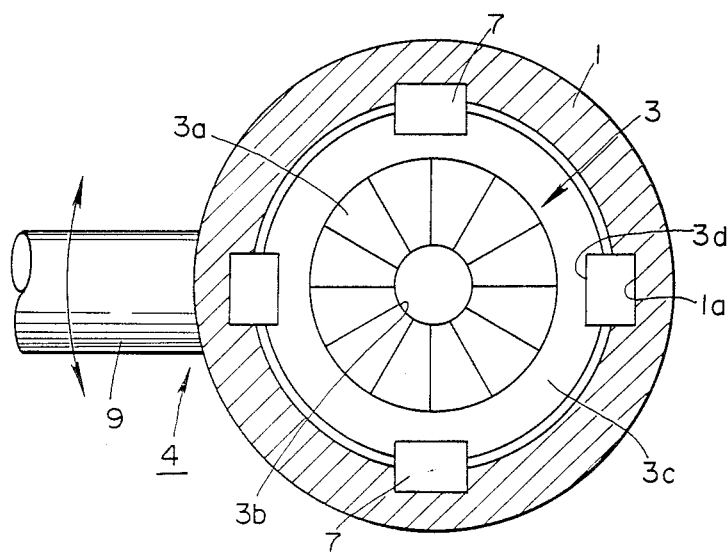
FIG. 2 is a cross-sectional view on line A—A of FIG. 1.
Figure 3:
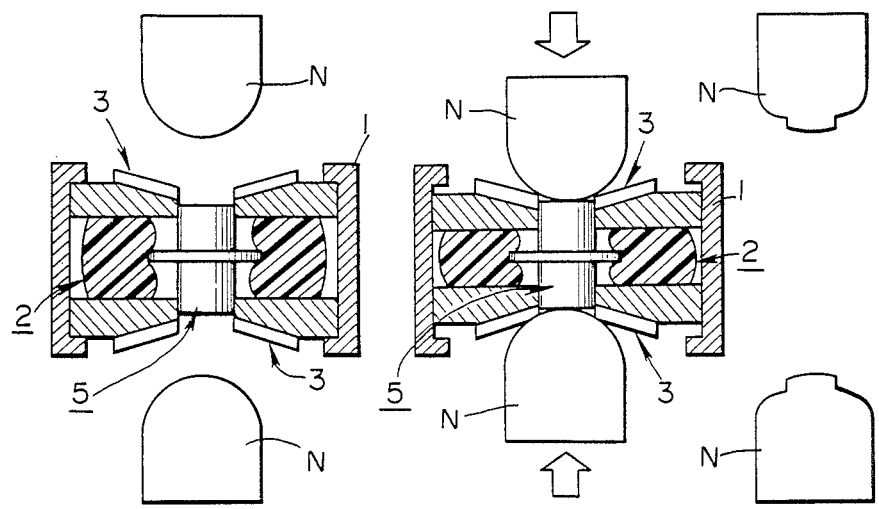
FIG. 3 is a view showing the operation of the invention.

The support mechanism 5 of the electrode chips N in FIGS. 1 to 3 is a columnar body having a brim 5a at its center which is held in the rubber cylinder 6. Its columnar parts 5b are inserted into the central openings of the cutters 3,3. The spaces S remain between the ends of columnar parts 5b and the ends of openings 3b in the cutters. The support mechanism 5, the keys 7 and the snap rings 8 can be made of a non-conducting material such as a Zirconium oxide or a coating of a non-conducting substance.

The numeral 9 is a rotating lever and the rotation mechanism 4 of the cutters 3,3 is constructed by the lever 9, the cylindrical member 1, the keys 7 and the key slots 1a,3d.

In the forming unit shown in FIGS. 1 to 3, as shown in FIG. 3, the electrode chips N are pressed against the cutting edges 3a of the cutters 3,3 after positioning the forming unit of the invention between the upper and lower electrode chips of the welder. The cutters 3,3 elastically supported by the rubber cylinder 6, compress the rubber cylinder 6 and expand it radially outward toward the cylindrical member 1 and the keys 7. The spaces S between the electrode chips and support mechanism 5 decrease.

When the rotation lever 9 is rotated right and left, the points of the upper and lower electrode chips are cut by the cutting edges 3a of the cutters 3,3, into prescribed shape. When the forming is completed, the forming unit may be removed after stopping the rotation of the rotation lever 9 and separating the electrode chips.

Figure 4:
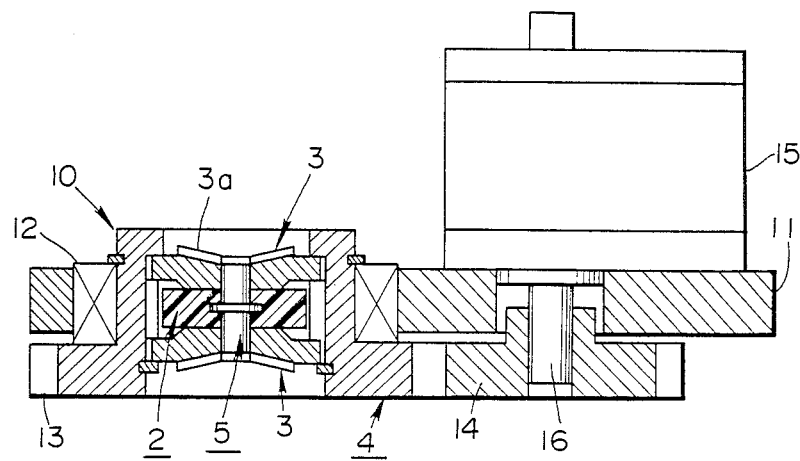
FIG. 4 is a cross-sectional view showing another embodiment of the invention.
Figure 5:
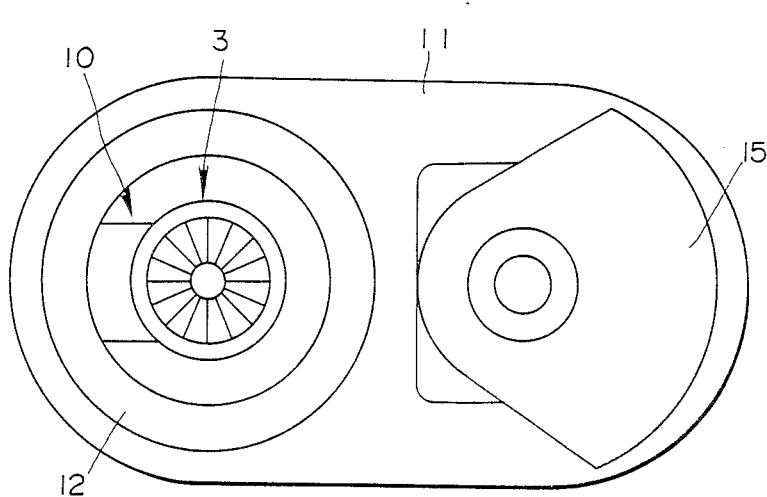
FIG. 5 is a plane view of FIG. 4.

The embodiment shown in FIGS. 4 and 5 uses a motor to rotate the cutters 3,3. In FIGS. 4 and 5, the same parts or members shown in FIG. 1 to 3 are indicated by the same numbers.

In FIGS. 4 and 5, the cylindrical member 10 is supported on the plate 11 at the upper part of the cylindrical member by the bearing 12 and its lower part has a gear 13 at the outside diameter of the cylindrical member. The numeral 14 is a pinion which engages the gear 13. Pinion 14 is connected to the drive mechanism 15 mounted on the plate 11 by a shaft 16. The drive mechanism 15 employs a rotational cylinder, electric type motor with a reduction mechanism, a hydraulic motor and so on.

By the above construction, the plate 11 can be supported by the arm of a simplified robot (not shown), for example, and when the points of the electrode chips N of the welder are worn away, the electrode chips can be reformed after the forming unit is positioned between the upper and lower electrode chips N so that the cutters 3,3 are positioned to receive their chips N. By doing so, the cutters 3,3 are supported by the rubber cylinder 6 elastically. As rubber cylinder 6 is compressed and expands radially outward toward the cylindrical member 10, spaces S are reduced. The drive mechanism 15 rotates pinion 14 through shaft 16 to rotate the cylindrical member 10 through gear 13 which engages the pinion 14. Accordingly, the cutters 3,3, mounted within the cylindrical member 10, rotate so that the points of the upper and the lower electrode chips N are formed by the cutting edges 3a into the prescribe shapes. When the forming is finished, the forming unit is removed by moving the electrode chips up and down after stopping the operation of the drive mechanism 15.

EFFECT OF THE INVENTION

This invention, as described above, is constructed by providing a cylindrical member, one or more cutters supported in the cylindrical member by an elastic support mechanism, a rotation mechanism for the cutters and a support mechanism for supporting an electrode chip to be cut, so that the electrode chip can be formed while the chip remains in the welder, thereby saving trouble and time and performing core-fitting automatically. Therefore, the electrode chip has the proper shape to produce high quality welding which can be achieved without disturbing the flow of a manufacturing line having weld robots. Also, by supporting the electrodes chips while reforming, accurate reforming is possible without applying excessive force. Furthermore, in the embodiments described, the electrode chips are reformed safely in the welder because the support mechanism is formed from or covered by a non-conducting material.

What is claimed:

1. A forming unit for an electrode chip of a welder comprising:
    a cylindrical housing;
    a cylindrical electrode chip separator within said housing and axially aligned with the longitudinal axis of said housing;
    upper and lower circular cutters slidably mounted on said chip separator for movement along said longitudinal axis of said housing;
    a resilient cutter separator disposed between said cutters and around said chip separator for urging axial separation of said cutters;
    means for attaching said cutter separator to said chip separator to prevent axial movement of said cutter separator relative to said chip separator; and
    means for limiting axial separation of said cutters.

2. The forming unit of claim 1 wherein said resilient cutter separator is an annular elastomer.

3. The forming unit of claim 2 wherein said means for attaching said cutter separator to said chip separator include an annular protrusion around the midpoint of the length of said chip separator and a corresponding annular groove in said cutter separator within which said annular protrusion is fitted.

4. The forming unit of claim 3 wherein said means for limiting axial separation of said cutters include upper and lower abutments in said housing against which said upper and lower cutters abut.

* * * * *